Figure 1:
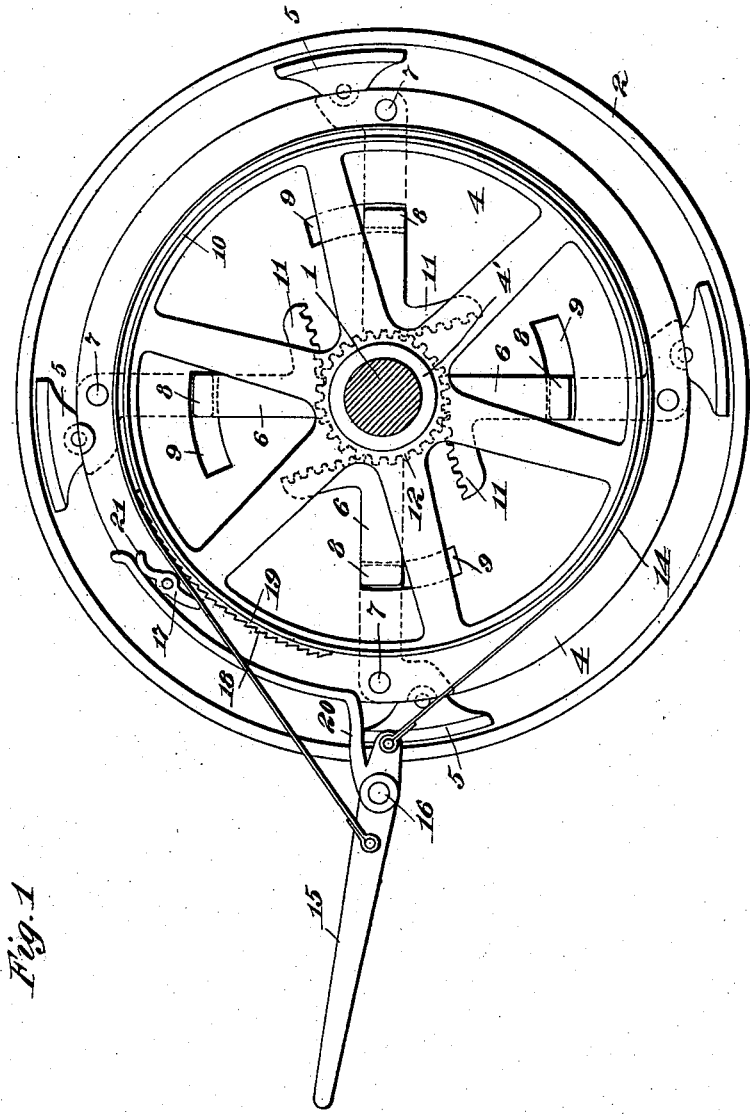

No. 661,117. Patented Nov. 6, 1900.
F. L. DYER.
FRICTION CLUTCH.
(Application filed Oct. 19, 1898.)

(No Model.) 3 Sheets—Sheet 1.

Witnesses: Inventor
Frank L. Dyer

No. 661,117. Patented Nov. 6, 1900.
F. L. DYER.
FRICTION CLUTCH.
(Application filed Oct. 19, 1898.)
(No Model.) 3 Sheets—Sheet 2.
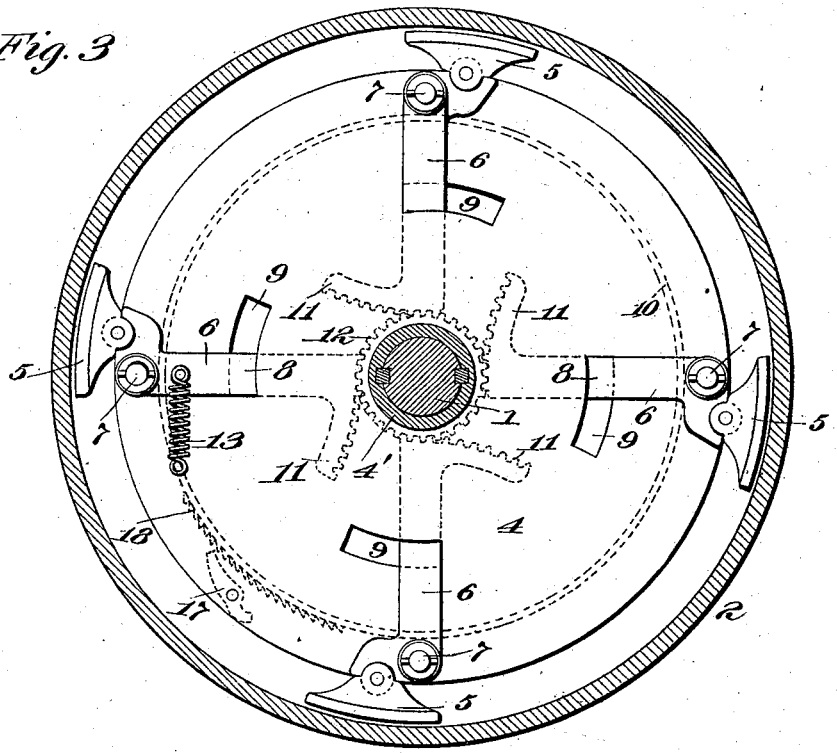
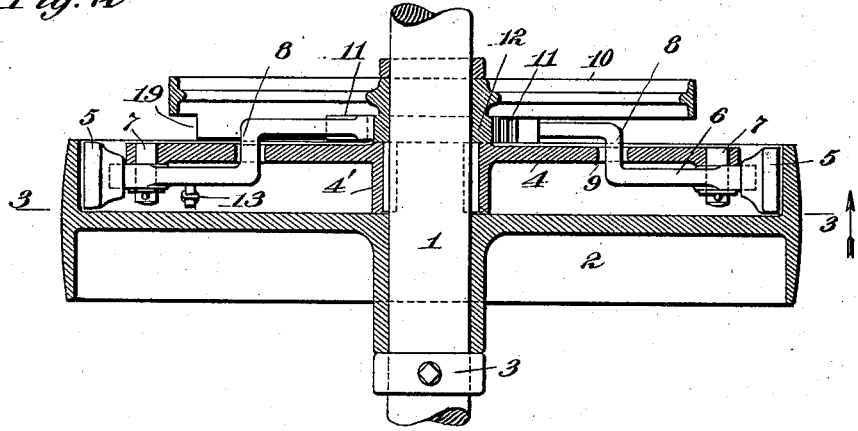
Witnesses: Inventor
Jas. F. Coleman Frank L. Dyer
Archie F. Reese No. 661,117. Patented Nov. 6, 1900.
F. L. DYER.
FRICTION CLUTCH.
(Application filed Oct. 19, 1898.)
(No Model.) 3 Sheets—Sheet 3.
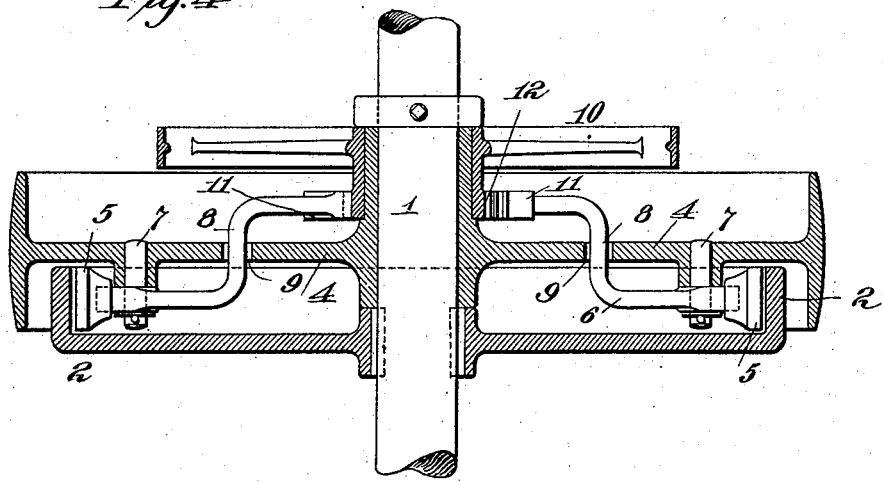
Witnesses:
Inventor

UNITED STATES PATENT OFFICE.

FRANK L. DYER, OF MONTCLAIR, NEW JERSEY.

FRICTION-CLUTCH.

SPECIFICATION forming part of Letters Patent No. 661,117, dated November 6, 1900.

Application filed October 19, 1898. Serial No. 693,955. (No model.)

*To all whom it may concern:*

Be it known that I, FRANK L. DYER, a citizen of the United States, residing at Montclair, in the county of Essex and State of New Jersey, have invented certain new and useful Improvements in Friction-Clutches, of which the following is a specification.

My invention relates to various new and useful improvements in friction-clutches; and the objects of the invention are to simplify the construction and improve the efficiency of such clutches.

With friction-clutches as heretofore used the two clutch members have been moved together in the direction parallel to the shaft, and it therefore has been necessary with such clutches to make use of a thrust-bearing. With such clutches also the limit of play between the two clutch members has been very slight, and in the event of wear either of the friction-surfaces or of the thrust-bearing the adjustment would be destroyed and the two clutch members thereby prevented from being forcibly locked together. With my improved clutch I am enabled to dispense with a thrust-bearing, for the reason that the movement of the friction-surfaces is in a direction at right angles to the shaft. In my improved clutch the forcing together of the two clutch members is effected by the power itself, whereby the clutch will be quicker in action and can be applied with less exertion than ordinary clutches. Moreover, with my improved clutch there is a very much greater opportunity for movement between the wearing parts than in ordinary clutches, and in consequence the adjustment of the parts is preserved for a longer time.

In carrying out my invention I employ a shaft on which is carried the fulcrum or fulcrums of one of the clutch members, said clutch member or the several parts thereof being movable in a direction at right angles to the shaft, either toward or away from the center thereof, an auxiliary brake device normally turning with said clutch member, but adapted to be retarded in its rotation, whereby the clutch member or the component parts thereof will be moved, and a second clutch member normally stationary and adapted to be engaged by the movable clutch member or the component parts thereof. Preferably, also, I provide a suitable locking device by which the movable clutch member or the component parts thereof may be locked in frictional engagement with the normally-stationary clutch member. If such a locking device is employed, it is preferable to make use of mechanism for unlocking the same when desired to release the clutch members and to allow them to separate. This releasing device may conveniently form a part of the same element by which the auxiliary brake-wheel is retarded to engage the clutch members together.

In the accompanying drawings I illustrate a convenient embodiment of my present invention, and in which—

Figure 1 is a side elevation with the shaft in section; Fig. 2, a vertical longitudinal sectional view through the shaft; Fig. 3, a section on the line 3 3 of Fig. 2 looking in the direction of the arrow, and Fig. 4 a similar view of a modification.

In all of the above views corresponding parts are represented by the same designating-numerals.

1 represents a shaft mounted in suitable bearings. (Not shown.) This shaft may be a driving-shaft, or it may be adapted to be driven by means of the clutch. I illustrate the shaft in Figs. 1, 2, and 3 as being a driving-shaft. When it is to be driven by the clutch, the latter will be suitably modified, as I will explain.

2 is one of the clutch members, which in this instance is loose on the shaft 1. I illustrate this clutch member as being an ordinary pulley-wheel from which power may be derived from the shaft. The clutch member 2 is prevented from moving longitudinally on the shaft by a collar 3.

4 represents a disk the hub 4' of which is keyed to the shaft 1, so that the disk 4 rotates with the shaft. The disk 4 constitutes the fulcrum of the movable clutch member or the component parts thereof. This movable clutch member in this specific instance is illustrated as composed of a series of brake-shoes 5 5 5, (four being shown,) that are connected to knuckle-levers 6, which are pivoted to the disk 4 on pins 7. The knuckle-levers are provided with a bend 8 and extend through slots 9 in the disk 4.

10 represents an auxiliary brake device, which in this instance is a narrow brake-wheel loosely mounted on the shaft 1. This brake device is connected to the levers 6 in such a way that normally the rotation of the shaft 1, carrying the disk 4 with it, will also rotate the brake device; but when the brake device is retarded in its rotation the levers 6 will be moved to apply the brake-shoes 5 to the interior rim of the clutch member 2. The connection between the brake device 10 and the levers 6 may be of any suitable character. I illustrate each lever as being provided with a toothed rack 11 at its inner end, all of which racks engage with a pinion 12, carried by the brake device 10. The levers 6 are normally retracted to withdraw the brake-shoes 5 from the clutch member 2 by a spring 13. Only a single spring may be used, since all of the levers 6 are connected together through the racks 11 and pinion 12; but if desired each lever may be provided with its own retracting-spring.

The rotation of the brake device 10 is retarded in any suitable way. In Fig. 1 I illustrate an ordinary band-brake 14, made, preferably, of a steel strip lined with a frictional material, such as leather, and connected at its ends to a lever 15, pivoted at 16 to a stationary device. (Not shown.) It will be seen that when power is applied to the shaft 1 the disk 4 will be rotated therewith, the brake-shoes 5 being retracted and the brake device 10 rotating with the disk. By now applying the brake 14 by operating the lever 15 the brake device 10 will be retarded and the forward movement of the disk 4 will cause the racks 11 to move upon the pinion 12, applying the brake-shoes 5 into close engagement with the clutch member 2 and locking that clutch member to the brake-shoes, whereby the clutch member 2 will then rotate with the shaft. It is preferable to provide a locking device by which the brake-shoes will be locked in this position, so that the brake 14 can then be released to allow the two clutch members to rotate together. For this purpose I illustrate a pawl 17, carried on the disk 4 and adapted to engage with teeth 18, formed on a segment 19 at one side of the brake device 10. When now the disk 4 is caused to move relatively to the brake device 10 by the retardation of the latter element, the pawl 17 will engage the teeth 18 and lock these two elements in their advanced position. In order to disengage the pawl 17 when it is desired to release the two clutch members, any suitable device may be employed. I illustrate the lever 15 as being provided with a finger 20, adapted to be interposed in the path of the tail 21 of the pawl 17 when the lever 15 is moved to an abnormally-retracted position, as shown in full lines, Fig. 1.

The operation of the device thus described is as follows: Normally the lever 15 is in horizontal position, withdrawing the finger 20 from the path of movement of the tail 21 of the pawl 17, the brake-shoes 5 being retracted from engagement with the clutch member 2. By now retarding the rotation of the brake device 10 by moving the lever 15 downward the forward movement of the disk 4 relatively to the brake device 10 will cause the racks 11 to move on the pinion 12 and apply the brake-shoes 5 simultaneously to the clutch member 2. During this engagement the pawl 17 will engage the teeth 18 on the brake device, and the latter will be locked in its forward position, holding the brake-shoes 5 tightly in engagement with the clutch member 2. When it is desired to release the clutch, the lever 15 is moved to an abnormally-retracted position, carrying the finger 20 into the path of movement of the tail 21 of the pawl 17, so as to trip the pawl and allowing the spring or springs 13 to retract the brake-shoes 5, moving the brake device 10 to its original position with respect to the disk 4.

If it is desired to apply the improved clutch to a normally-stationary shaft which is to be rotated, as shown in Fig. 4, it will be seen that the disk 4 or its equivalent may be rotated by power carrying the brake device 10 normally with it. In this case the clutch member 2 will be keyed to the shaft 1 and will be normally stationary with the shaft. By now retarding the rotation of the brake device 10 the movable clutch member will be caused to engage with the clutch member 2 in the same way and cause the latter clutch member to rotate, carrying the shaft with it.

Having thus described my invention, what I claim as new, and desire to secure by Letters Patent, is—

1. In a friction-clutch, the combination of a normally-stationary and a normally-movable member, said members being adapted to be moved into engagement in a direction at right angles to their axes of rotation, means for moving the clutch members relatively to engage together, a locking device for locking the clutch members in their engaged position, and means for tripping the locking device to release said clutch members, substantially as set forth.

2. In a friction-clutch, the combination with a rotatable clutch member movable toward and away from its axis of rotation, a brake device normally rotating with said clutch member, connections between the brake device and said clutch member for moving the clutch member radially by the retardation of the brake device, a second clutch member cooperating with the movable clutch member, and a locking device for locking the brake device in its retarded position, substantially as set forth.

3. In a friction-clutch, the combination with a rotatable clutch member movable toward and away from its axis of rotation, a brake device normally rotating with said clutch member, connections between the brake device and said clutch member for moving the clutch member radially by the retardation of the brake device, a second clutch member coöperating with the movable clutch member, a locking device for locking the brake device in its retarded position, and means for releasing said locking device, substantially as set forth.

4. In a friction-clutch, the combination with a rotatable clutch member movable toward and away from its axis of rotation, a brake device normally rotatable with said clutch member, connections between the brake device and said clutch member for moving the latter radially upon the retardation of the brake device, a second clutch member with which the movable clutch member coöperates, and a pawl carried by the movable clutch member for locking the brake device in its retarded position, substantially as set forth.

5. In a friction-clutch, the combination with a rotatable clutch member movable toward and away from its axis of rotation, a brake device normally rotatable with said clutch member, connections between the brake device and said clutch member for moving the latter radially upon the retardation of the brake device, a second clutch member with which the movable clutch member coöperates, a pawl carried by the movable clutch member for locking the brake device in its retarded position, a brake for retarding said brake device, and a trip carried by said brake for releasing the locking-pawl, substantially as set forth.

This specification signed and witnessed this 17th day of October, 1898.

FRANK L. DYER.

Witnesses:
JAS. F. COLEMAN,
JNO. R. TAYLOR.